May 3, 1960     E. B. MARPLE     2,935,197

GREASE TRAP DEVICE

Filed Sept. 17, 1958     7 Sheets-Sheet 1

INVENTOR.
ELMORE B. MARPLE
BY M. Y. Charles
ATTORNEY.

May 3, 1960 E. B. MARPLE 2,935,197
GREASE TRAP DEVICE
Filed Sept. 17, 1958 7 Sheets-Sheet 4

INVENTOR.
ELMORE B. MARPLE
BY M. Y. Charles
ATTORNEY.

E. B. MARPLE 2,935,197

GREASE TRAP DEVICE

Filed Sept. 17, 1958

INVENTOR.
ELMORE B. MARPLE
BY M. Y. Charles
ATTORNEY.

May 3, 1960 — E. B. MARPLE — 2,935,197
GREASE TRAP DEVICE
Filed Sept. 17, 1958 — 7 Sheets-Sheet 7

INVENTOR.
ELMORE B. MARPLE
BY M. Y. Charles
ATTORNEY.

United States Patent Office 2,935,197
Patented May 3, 1960

2,935,197

GREASE TRAP DEVICE

Elmore B. Marple, Salina, Kans.

Application September 17, 1958, Serial No. 761,541

9 Claims. (Cl. 210—109)

My invention relates to an improvement in grease traps and refers more particularly to the type used in residences, apartments, restaurants and such places where the drainage consists of a mixture of water and grease and it is desirable and in some instances it is even required that the grease be separated from the water and only the water be discharged into the sewer and the grease must be disposed of otherwise.

My improved grease trap herein shown and described is designated to efficiently meet these requirements.

A further object of the invention is to provide a grease trap of the kind mentioned that is simple in construction, inexpensive to make, highly efficient in its work, one that is sanitary as well as one that is simple and easy to clean and easy to remove the grease. These and other objects will be more fully explained as this description progresses.

Now referring to the accompanying drawings in which similar numerals of reference designate the same parts throughout the several figures of the drawings.

In the drawings my improved grease trap device is shown as comprising a tank T having side walls 15 and 16, end walls 17 and 18 and extends substantially from top to bottom thereof and the lower end of the intake pipe 21 turns and opens through the wall 18 into the tank T at a point immediately adjacent the bottom 19 of the tank T. The upper end of the intake pipe 21 is provided with a closure plug 22 and immediately below the closure plug 22 is an outwardly extending nipple 23 that is an integral part of the intake pipe 21, the nipple 23 being threaded at 24, to receive a drain pipe fitting (not shown).

In the tank T is shown a plurality of transversely positioned baffle plates 25 and 26, the vertical edges of which are integrally joined with their respective side walls 15 and 16 of the tank T, the lower edges of the baffle plate 26 is spaced above the bottom 19, and the upper edge of the baffle plate 26 is positioned well below the upper edges of the tank walls 15, 16, 17 and 18. The lower edge of the second baffle plate 25 is integrally joined with the bottom 19 and the upper edge of the baffle plate is also spaced well below the upper edges of the side and end walls 15, 16, 17 and 18. The end wall 17 of the tank T is provided with a drainage tube that is an integral part of the wall 17 and extends substantially from the top to the bottom thereof. The upper end of the discharge drainage pipe 27 is provided with a closure plug 28 that is threaded thereinto and at the bottom of the drainage pipe 27 is an opening 30 through the end wall 17 connecting the intake drainage pipe 27 with the interior of the tank T. At a spaced distance below the top of the drainage pipe 27 is an outwardly projecting nipple 29 that is internally threaded as shown at 31 to receive a discharge drainage pipe connection (not shown) as will readily be understood. The purpose of the plugs 22 and 28 is to provide clean out openings by removing the plugs 22 and 28 if such cleaning of the openings is ever necessary.

Also at the top of the drainage tube 27 is a hole 27a, through the wall 17 that opens into the upper end portion of the drainage tube 27. The object of the hole 27a is that as the tank T fills with liquid, air that is in the tank T will discharge through the hole 27a through the discharge pipe 27 so as to not offer a resistance to any incoming liquid that is to fill the tank T.

The baffle plates 25 and 26 divide the interior of the tank T into a plurality of zones A, B, and C for purposes that will later be made obvious.

On the side wall 16 of the tank T and substantially about half way up the height of the wall, and midway between the walls thereof is an outwardly projecting tube element 32 that is an integral part of the wall 16 and one end of which passes through and opens to the outside and terminates in a downwardly directed L-formation 33.

On the inner end of the tube 32 is formed an upwardly directed annular flange 34 having a bottom 35 therein which has a hole 36 therein that opens into the tube element 32 for grease draniage purposes.

The lower end of the L 33 of the tube 32 slidably passes through a container top closure 38 to discharge into a container 37, the upper end of which is attached to the closure element 38, either by being threaded into or snugly slidably fitted thereto.

The device is further provided with a vent tube 39, one end of which connects into the tubular element 32 and the other end connects into the discharge pipe 27 of the grease trap for purposes of venting obnoxious gases from the container 37 into the drainage line of the plumbing or sewer system.

The grease trap device is further provided with a weir device which comprises a circular weir flange 40 on the opposite sides of which is positioned one of a pair of float elements 41 and 42, each of which is rigidly connected to the weir flange 40 by suitable connecting elements 43 and 44.

The device is further provided with a plurality of guide legs 45, the lower ends of which are set on the bottom plate 35 and are rigidly attached (preferably welded or brazed) to the bottom plate 35 and extend upwardly therefrom.

The legs 45 are further retained in their fixed spaced apart position by means of a ring 46 that is positioned within the circle of the legs 45 and is rigidly attached (welded or brazed) to each of the legs 45. Similarly the upper ends of the legs 45 are held in the same equally spaced apart position by means of a second ring 47 which is also fitted within the circle of the legs 45 and bears thereagainst and is rigidly attached thereto, by being welded or brazed at a point flush with the top ends of the legs 45. The weir flange 40 is large enough in diameter that it will easily and freely move up and down around the circle of guide legs 45.

The weir device is further provided with a flexible sealing tube 48, one end of the sealing tube 48 is rigidly clamped around the outside of the upwardly extending flange element 34, by means of a clamp band 49.

The upper end of the sealing tube 48 is tightly fitted around the lower edge of the weir flange 40 and is rigidly clamped thereto by means of a clamp band 50. The sealing tube 48 being long enough that it will allow for a considerable amount of up and down movement of the weir flange 40 as will later be described.

Figure 9:
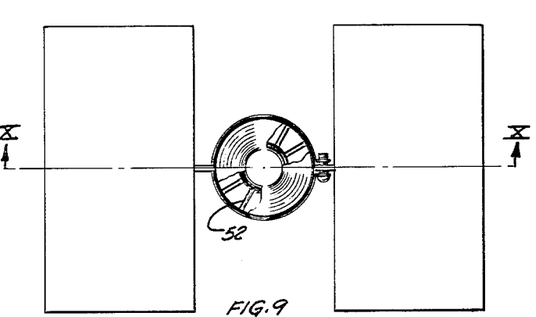
Fig. 9 is a top plan view of a modified form of the float, and weir assembly that may be substituted for that shown in Figs. 7, 8, 4 and 5.
Figure 10:
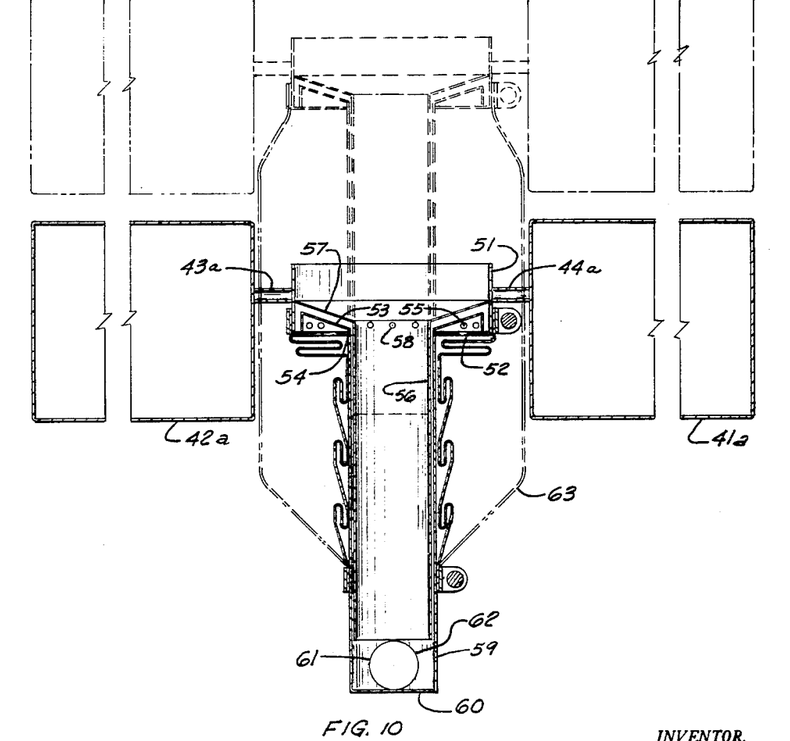
Fig. 10 is an enlarged, detail, longitudinal, sectional view through the modified form of the weir assembly, the view being as seen from the line X—X in Fig. 9 and looking in the direction of the arrows.
Figure 11:
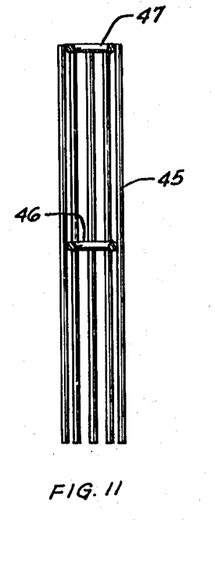
Fig. 11 is a detail side view of the weir support means, parts of which are shown in section for convenience of illustration.
Figure 12:
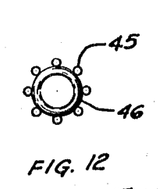
Fig. 12 is a top plan view of the device shown in Fig. 11.

In Figs. 9 and 10 is shown a modified form of the weir assembly that may be substituted for that just described.

In this modification is shown a weir nipple having upwardly extending circular sides 51, and inwardly extending spoke like elements 52, one end of which is attached to the lower edge portion of the weir nipple 51. The other end of the spoke like elements 52 are integrally joined to a circular element 53, having an opening 54 in the center thereof and the inner edge of the material defining the opening 54 is turned upwardly and outwardly from the opening 54 and then turned downwardly to meet the inner end portion of the spoke elements 52 so as to leave an inverted V-shaped annular channel around the opening 54.

The last mentioned turned down edge has a plurality of vent openings or holes 55 therein for purposes that will later be made obvious.

The device is further provided with a tubular element 56 that extends upwardly through the opening 54 and the upper end of the tubular element 57 flares outwardly in a funnel like formation 57, the outer edge of which is attached to the nipple wall 51.

The upper end of the tubular element 56 has a plurality of vent holes 58 therethrough that are positioned immediately at the bottom of the flaring portion 57 of the tube 56.

The device is provided with still another vertically positioned tubular element 59 in which the lower portion of the tubular element 56 is positioned and is vertically movable up and down therein.

The lower end of the vertical tube 59 has a bottom 60 therein and has an opening 61 in the side wall thereof and adjacent the bottom 60.

The device is provided with still another tubular element which has previously been described and one end of the tube 32 connects with the side wall of the tube 59 and covers the opening 61 to receive drainage from the tubular element 59 to be disposed of in the same manner as it is from the tube 32 which has previously been described.

The device is further provided with a thin walled flexible sealing tube 63, the upper end of which is positioned around the lower end portion of the weir nipple 51 and is clamped thereto as previously described and the other end of the sealing tube 63 is snugly fitted around the tubular element 59 and is tightly clamped to the lower mid-portion of the tubular element 59 in the same manner as the upper end of the sealing tube 63 is attached to the lower end of the weir nipple 51.

Figure 14:
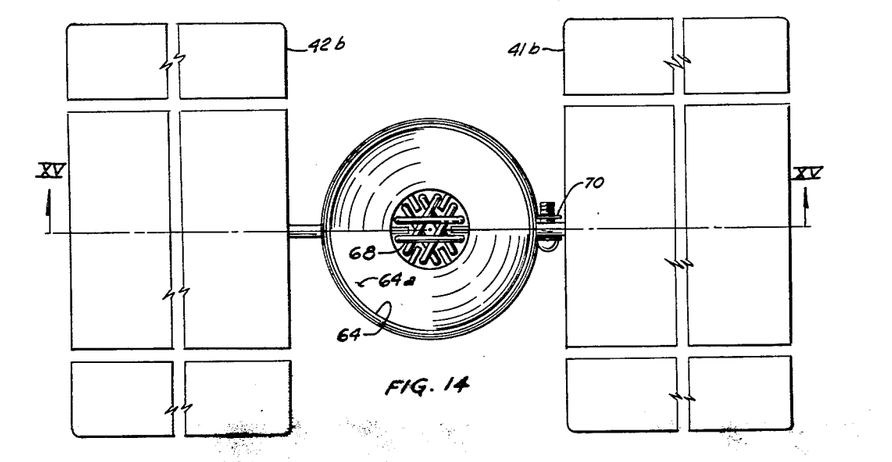
Fig. 14 is a top plan view of a modified form of the float and weir assembly.
Figure 15:
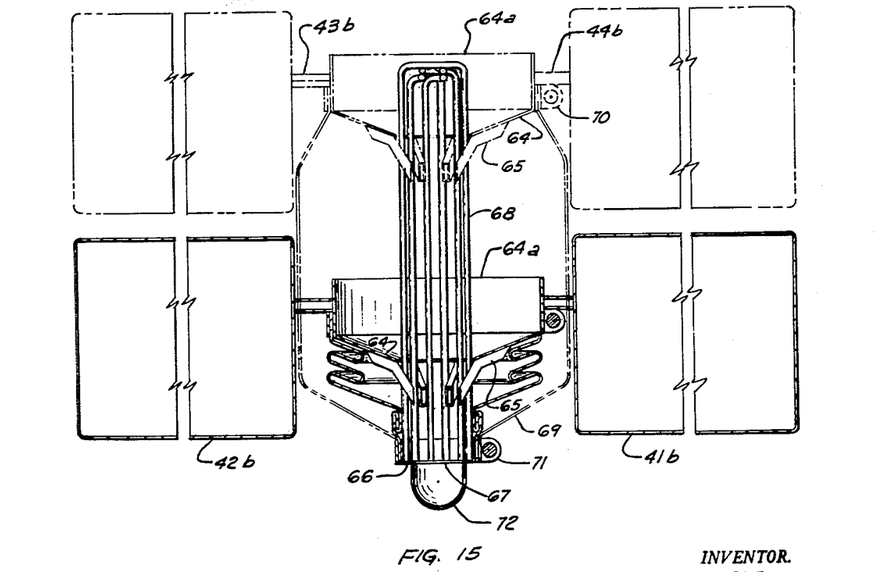
Fig. 15 is a detail sectional view through the modified form of the float and weir assembly, the view being as seen from the line XV—XV in Fig. 14 and looking in the direction of the arrows.

In Figs. 14 and 15 is shown still another modification of the weir assembly. In these views the weir assembly shows the device as having the previously described float elements 41 and 42 between which is positioned a weir 64 that is attached to the floats and is carried thereby by means of attachment elements 43b and 44b.

The weir is funnel shaped as indicated at 64 and has a nipple shaped formation 64a around the top thereof into which the supporting elements 43b and 44b are attached.

The funnel shaped portion 64 has a plurality of rectangular shaped guide legs 65 that are rigidly attached to the outer surface of the funnel shaped elements 64 and are equally spaced therearound and the lower ends of which extend below the bottom of the funnel shaped element 64 in somewhat of a converging position.

The device is further provided with a cup shaped element 66, the bottom of which has a centrally positioned hole 67 therein. The cup is further provided with a cage like guide means composed of a series of inverted U shaped elements 68, the legs of which are positioned within the cup and are equally spaced around the walls of the cup and the legs of which are rigidly attached to the wall of the cup 66 to hold each U-shaped element in a diametrical position across the cup so that the guide legs 65 can be positioned between each adjacent pair of legs of the U-shaped elements 68 so as to permit a guided vertical movement up and down of the guide legs 65.

The device is further provided with a thin flexible sealing tube 69, the upper end of which is tightly fitted around the lower portion of the nipple like side wall 64a of the funnel shaped element 64, and is rigidly held in place by means of a screw tightened clamp band 70 and the lower end of the sealing tube 69 is tightly fitted around the side wall 66 of the cup shaped element 66 and is also rigidly held in place by a second screw tightened band 71.

The device is further provided with a drainage tube 72, one end of which connects with the cup like element 66 and covers the opening 67 to receive drainage therefrom.

Figures 5, 6:
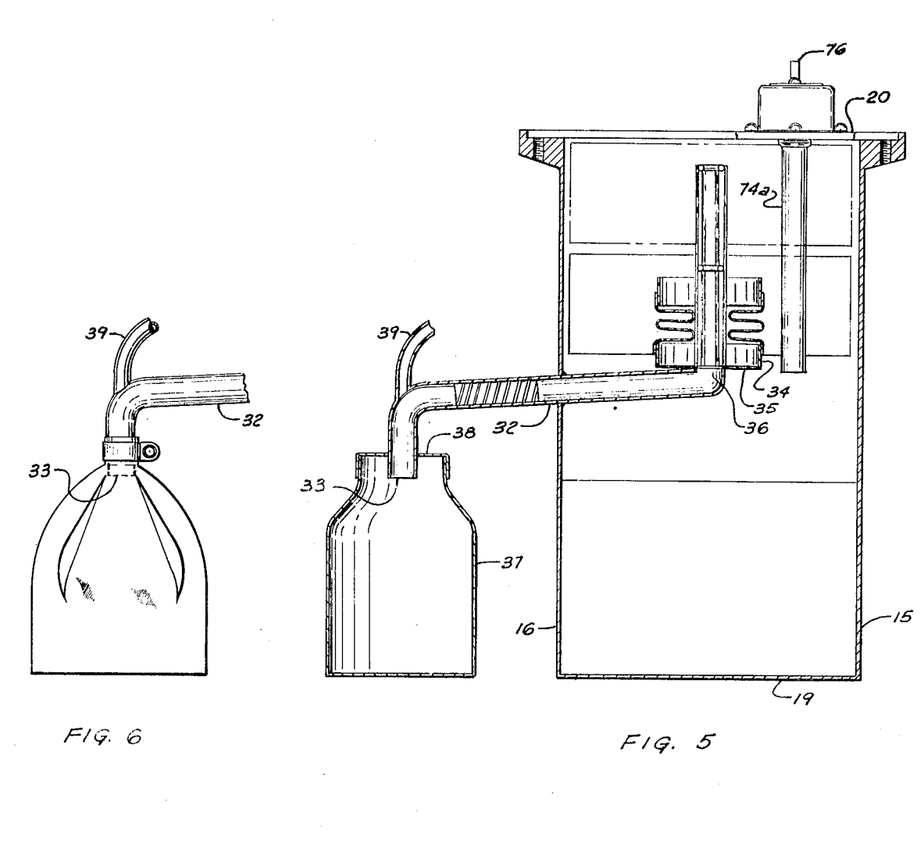
Fig. 5 is a transverse sectional view through the device, the view being as seen from the line V—V in Fig. 1 and looking in the direction of the arrows.
Fig. 6 is a side view of a modified form of the grease receiver device.
Figure 7:
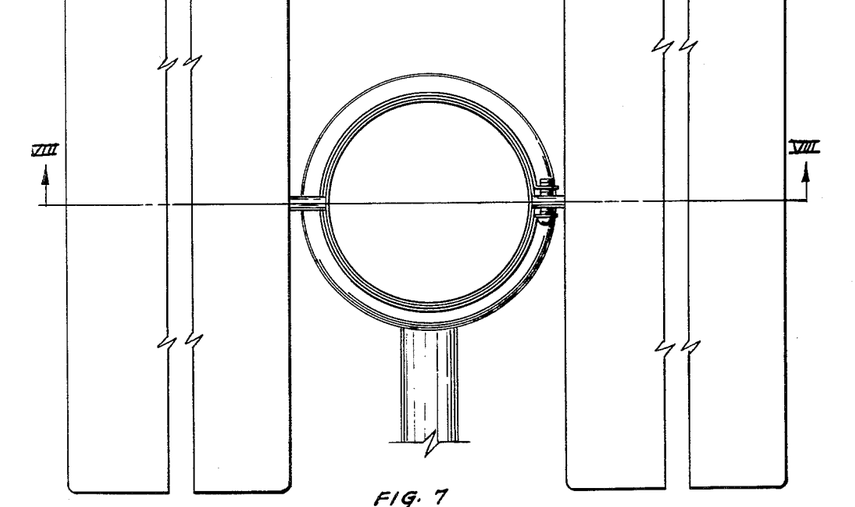
Fig. 7 is an enlarged, detail plan view of the float means and weir assembly employed in the device.
Figure 8:
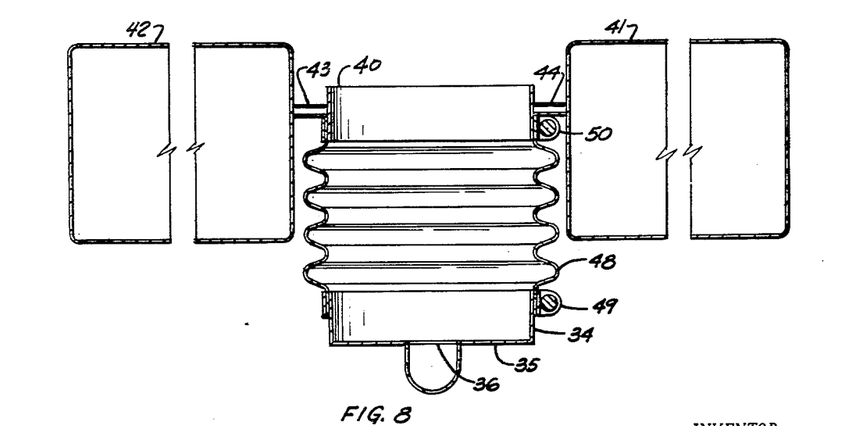
Fig. 8 is a detail longitudinal, sectional view through the float and weir assembly device, the view being as seen from the line VIII—VIII in Fig. 7 and looking in the direction of the arrows.

The other end of the tube 72 extends through the side wall 16 of the grease trap to discharge into the grease receiving container 37, the same as does the tubes 62 and 32, shown in Figs. 5, 6 and 10.

In as much as the grease that rises to the top of the water in the grease trap will become cooled, it may not flow over the top edge of the weir, therefore it becomes necessary to provide means for heating the contents of the grease trap to insure an easy and free flow of the grease floating on top of the water in the grease trap.

Now to accomplish this action, I have provided a plurality of electrical heating coils 73, each of which is carried in a respective tubular housing element 74. Each of the tubular housing elements 74 are threadedly attached with a water proof joint into the coverplate 20 so that the housings 74 will extend downwardly into the grease and water in the grease trap so that heat radiated therefrom will be absorbed by the grease and water in the grease trap so as to maintain the grease in a free flowing liquid condition.

In another tubular housing 74a, if desired, a thermostat 75 may be placed so that the temperature developed in the grease trap would cause the thermostat to make and break the electric circuit to maintain a predetermined temperature in the grease trap.

Figures 3, 13:
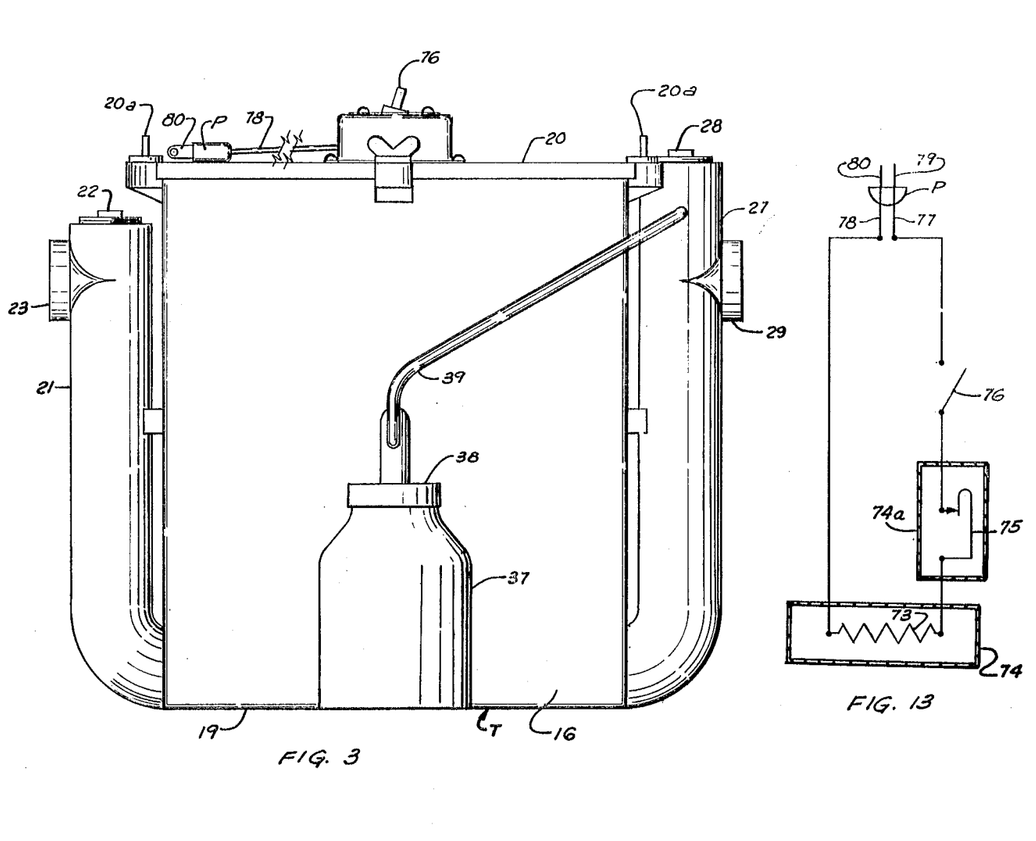
Fig. 3 is a side view of the completely assembled grease trap device.
Fig. 13 is a wiring diagram showing an electric heating element employed in the device for heating grease accumulated therein to a point where the grease will flow freely for disposal purposes.

As shown in Fig. 13, the heating elements are wired in parallel and the thermostat is positioned in one side of the circuit so as to make and break the circuit to maintain the desired temperature as will readily be understood.

The electric system is also controlled with a master control switch to manually break or make the circuit for putting the device in or out of use at will.

The wires 77 and 78 are feed lines for the device, one end of each wire 77 and 78 connects with the contact points 79 and 80 of a standard service plug P which may be plugged into any standard electric outlet plug as will readily be understood.

Figures 1, 2:
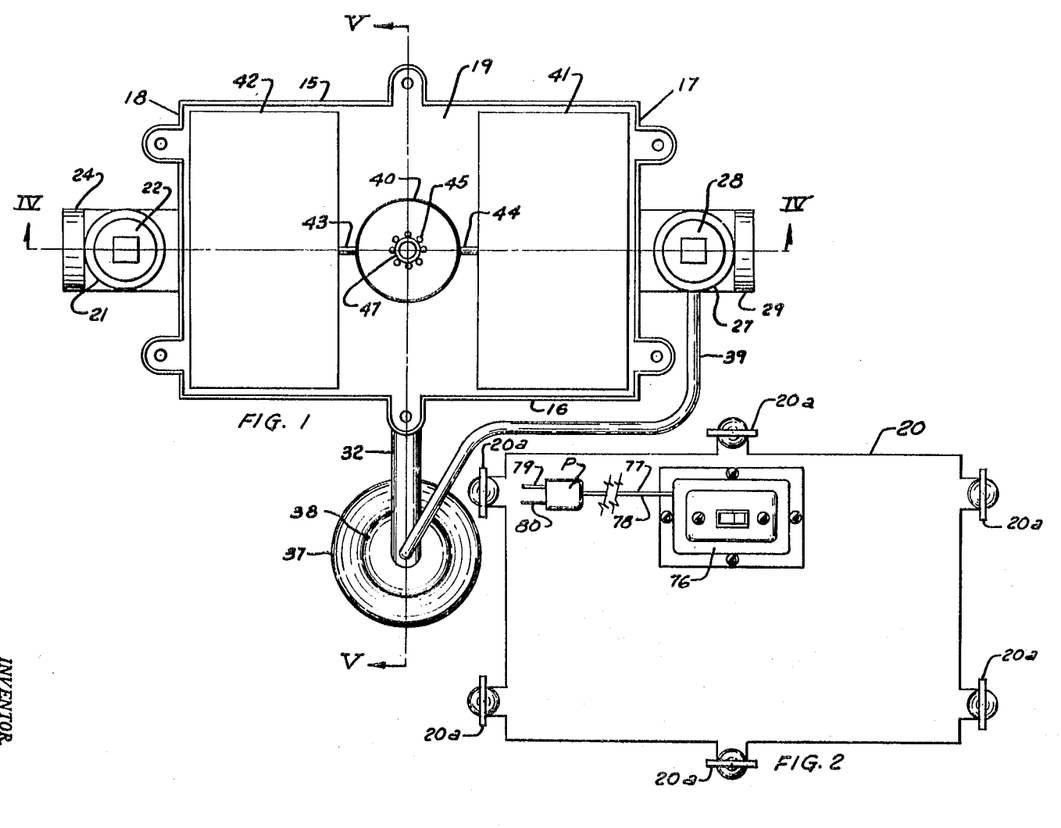
Fig. 1 is a top plan view of my improved grease trap device, the cover element of the device being removed for purposes of illustration of internal parts of the device.
Fig. 2 is a top plan view of the cover element which is omitted in Fig. 1.
Figure 4:
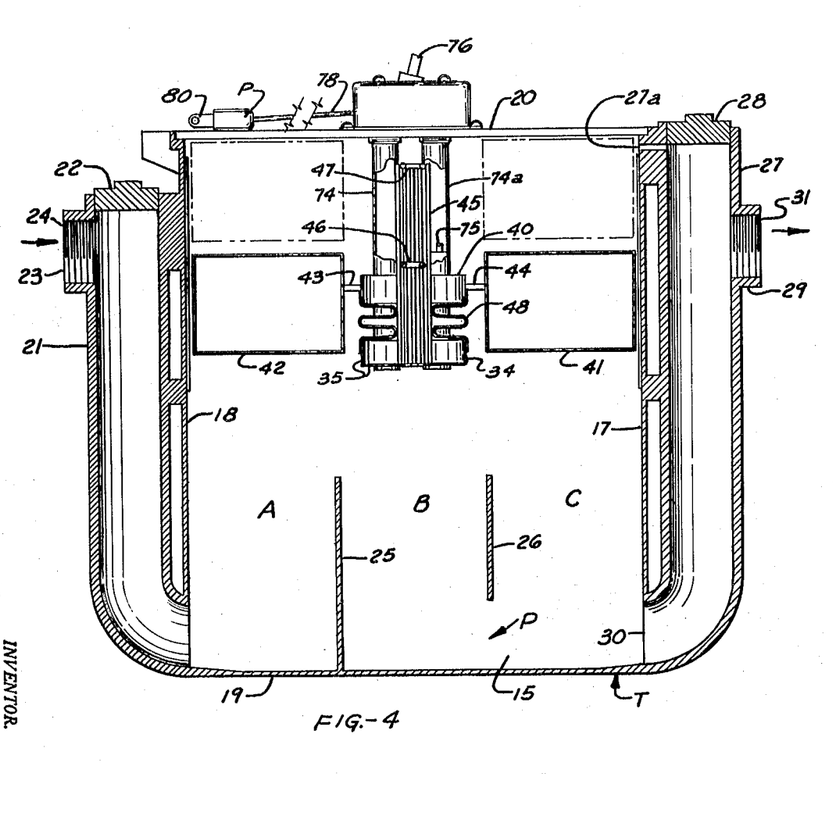
Fig. 4 is a detail, longitudinal sectional view through the device, the view being as seen from the line IV—IV in Fig. 1 and looking in the direction of the arrows.

It will be understood that any of the weir devices shown in Figs. 1, 4 and 5, or in Figs. 7, 8, 9 and 10 or Figs. 14 and 15, may each be substituted for the other if desired, and they will all give satisfactory service.

The operation of the grease trap device is as follows: The mixture of grease and water enters the grease trap device through the nipple and intake pipes 21 and 23 and enters the zone A at the bottom thereof and as the reservoir fills the water and grease will overflow the top of the baffle plate 25 and spill into the zone B and flow under the baffle plate 26 to fill both of the zones B and C, and the flow also will go through the opening 30 and fill the discharge pipe 27 until the water will overflow and be discharged thru the nipple 29. In this process the overflow through the zones A, B, and C is slow and during the time of this flow, the grease, being lighter than the water, will rise to the top of the water, the discharge through the nipple 29 will be water only, and as the zones A, B, and C fill, the floats 41 and 42 will float in the grease covered water, and carry the upper edge of the weir 40 above the upper surface of the grease floating on top of the water. As the upper layer of grease thickens, more of the floats 41 and 42 will be carried in the grease, and in as much as the grease is lighter than the water, the floats 41 and 42 will sink deeper in the grease than they did in the water, whereupon the upper edge of the weir 40 will be positioned below the upper surface of the grease and the grease will overflow the upper edge of the weir 40 and by gravity find its way downwardly to and thru the tube 32 to be received in the container 37, which, when filled or nearly filled, may be removed from the grease trap device and emptied and replaced to again receive the discharging grease.

As the grease is discharged into the container, air which was in the container and may now be contaminated with an offensive odor from the grease and this air, as the container fills with grease is discharged or drawn off through the vent tube 39 as, and in the same manner and previously described.

It will be noted that as the floats 41 and 42 rise and lower, as above described, the weir 40 is similarly raised and lowered and due to its association with the stationary parts therebelow, the sealing tube 48 will seal the water in the zone B. The sealing tube 48 will seal the surrounding liquid from entering the cup 34—35, between the weir nipple 40 and the cup flange 34, and as the weir assembly moves up and down, the flexible sealing tube 48 will give and crumple to allow for the movement of the floating weir assembly—so that, as above described, the grease only will overflow the upper edge of the weir and be allowed to enter the cup 34—35, for drainage therefrom as above described.

Now if the water and grease in the zones A, B, and C were allowed to stand for some time without additional water and grease, being added, the water and grease in the grease trap may become cooled, and the grease would become stiff and not flow over the upper edge 40 of the weir.

In this instance the electric switch 76 may be closed to complete an electric circuit, in which is included the electric heating elements 73 and thermostat 75, whereupon the heating elements 73 will become heated and will in turn heat the water and grease in the zones A, B, and C until the grease is fully fluid and will overflow the upper edge 40 of the weir.

When the grease is sufficiently heated, the thermostat 75 will break the electric circuit and the device will continue to function without additional heat until such time as the water and grease is again cooled to such a point that additional heat is needed, whereupon the thermostat 75 will again complete the electric circuit and the heating process above described will again be repeated.

Now while the device as shown and described is perhaps the preferable forms of the device, it is to be understood that such modifications of the device as lie within the scope of the appended claims may be employed without departing from the spirit and intention of the invention.

Now having fully shown and described my invention, what I claim is:

1. A grease trap device of the kind described; said device having a tank; said tank having side and end walls and a bottom and a top; baffle means therein for dividing the tank into a first and a second and a third zone, and drainage means for discharging drainage into the first zone and a discharge drainage means for discharging drainage from the third zone, said second zone being in drainage relationship from the first zone and the third zone being in drainage relationship from the second zone; said tank having a float carrier weir therein for receiving grease accumulated in the tank; a stationary receiving grease element; and means connected therewith for discharging grease therefrom, said means for discharging grease extending through a wall of the tank and having means thereon for receiving a grease receiving container; vent means; one end of said vent means being connected with the said receiving means for the grease receiving means and opening thereinto; the other end of said vent means connecting with and opening into the said drainage discharge means of the tank; said weir being movable vertically over the said stationary grease receiving element and flexible tubular means connecting between the weir and the stationary grease receiving element to exclude drainage into the stationary drainage receiving element from between the weir and the stationary receiving element; a second vent; said second vent opening through one wall of the tank and connecting between the interior of the tank and the said drainage discharge element; a cover element for said tank; said cover element being attachable to and detachable from said tank, and having an air-tight joint between the cover and the tank.

2. A grease trap device of the kind described the structure, parts and arrangement thereof as defined in claim 1; said float carried weir having guide means thereon, for permitting vertical movements of the float carried weir and for maintaining a concentric position of the weir over the said stationary grease receiving element.

3. A grease trap device of the kind described the structure, parts and arrangement thereof as defined in claim 1; said float carried weir having guide means thereon, for permitting vertical movements of the float carried weir and for maintaining a concentric position of the weir over the said stationary grease receiving element, said guide means serving as a support for the said flexible tubular means to avoid the collapsing of the said flexible tubular means from exterior pressure thereagainst.

4. A grease trap device of the kind described, the parts, structure and arrangement thereof as defined in claim 1, said weir having depending guide legs; said stationary grease receiving element having guide elements thereon; said depending guide legs fitting between and being vertically movable between the said guide elements on the stationary grease receiving element and serving to hold the weir in a concentric position over the said stationary grease receiving element; said guide legs and guide elements further serving as a support for the said flexible tubular element to prevent the inward collapsing of the said flexible tubular element from external pressure thereagainst.

5. A grease trap device of the structure, parts and arrangement thereof as defined in claim 1, said means for entering drainage into the tank being a tubular element and the tubular element terminating at a point adjacent the bottom of the tank and in the first said zone, said drainage discharge element being a tubular element, one end of which opens into the third said zone at a point immediately adjacent the bottom of the tank; the upper portion of the first said drainage tube and the upper portion of the last said drainage tube each having a removable plug therein for cleanout purposes, the upper portion of the first said drainage receiving tube having an outwardly extending nipple formation thereon for drainage tube attachment thereto; the upper end of the last said discharge drainage tube having an outwardly extending nipple formation thereon for attachment to a discharge drainage tube.

6. A grease trap device of the kind described, the structure, parts and arrangement thereof as defined in claim 1, the baffle means between the first and second zone being a plate, the ends of which join to opposite walls of the tank, and the lower edge of the baffle plate joins the bottom of the tank and the upper edge of the baffle plate being spaced well below the upper edges of the side and end walls of the tank; the second baffle between the second and third said zones being a plate positioned in parallelism with the first said baffle plate and having its ends joined to opposite walls of the tank, the lower edge of the second said baffle plate being spaced above the bottom of the tank; the upper edge of the second said baffle plate being spaced well below the upper edges of the tank walls to which it is joined and above the upper edge of the first said baffle plate.

7. A grease trap device of the kind described; the structure, parts and arrangement thereof as defined in claim 1, said cover element having housed heating elements carried thereby and depending therefrom and extending into the said zones and into the space to be occupied by liquid material, for purposes of heating the liquid material for the purpose specified.

8. A grease trap device of the kind described; the structure, parts and arrangement thereof as defined in claim 1, said cover element having housed heating elements carried thereby and depending therefrom and extending into the said zones and into the space to be occupied by liquid material, for purposes of heating the liquid material for the purpose specified; said heating elements being electric heating elements, and electric thermostat means operable by the temperature of the contents of the grease trap for making and breaking an electric circuit in which the electric heating elements are included.

9. A grease trap device of the kind described; the structure, parts and arrangement thereof as defined in claim 1, said float carried weir assembly comprising the aforesaid weir and float means adjacent the weir and rigidly attached thereto for supporting the weir assembly; said float means and weir assembly attached thereto being of such weight that the float means floating in water will support the upper edge of the weir above the surface of the water and as grease, which is lighter than water, rises to the top of the water, the floats will sink in the grease to such a point that the grease will overflow the upper edge of the weir and be drained away for disposal purposes as described.

References Cited in the file of this patent

UNITED STATES PATENTS

| | | |
|---|---|---|
| Re.23,628 | Glasgonw et al. | Mar. 10, 1953 |
| 617,057 | Sieben | Jan. 3, 1889 |
| 1,396,889 | Sepulchre | Nov. 15, 1921 |
| 1,450,545 | Hans | Apr. 3, 1923 |
| 1,938,604 | Mobley | Dec. 12, 1933 |
| 2,661,094 | Stewart | Dec. 1, 1953 |
| 2,776,054 | Hirshstein | Jan. 1, 1957 |